(12) United States Patent
Nojoumian

(10) Patent No.: US 10,981,563 B2
(45) Date of Patent: Apr. 20, 2021

(54) ADAPTIVE MOOD CONTROL IN SEMI OR FULLY AUTONOMOUS VEHICLES

(71) Applicant: Florida Atlantic University Board of Trustees, Boca Raton, FL (US)

(72) Inventor: Mehrdad Nojoumian, Boca Raton, FL (US)

(73) Assignee: FLORIDA ATLANTIC UNIVERSITY BOARD OF TRUSTEES, Boca Raton, FL (US)

( * ) Notice: Subject to any disclaimer, the term of this patent is extended or adjusted under 35 U.S.C. 154(b) by 181 days.

(21) Appl. No.: 16/165,509

(22) Filed: Oct. 19, 2018

(65) Prior Publication Data

US 2019/0126914 A1      May 2, 2019

Related U.S. Application Data

(60) Provisional application No. 62/580,233, filed on Nov. 1, 2017.

(51) Int. Cl.
*B60W 30/02* (2012.01)
*G05D 1/00* (2006.01)
(Continued)

(52) U.S. Cl.
CPC ........... *B60W 30/025* (2013.01); *B60K 28/00* (2013.01); *G05D 1/0055* (2013.01);
(Continued)

(58) Field of Classification Search
CPC ......... B60W 30/025; B60W 2540/043; B60W 30/182; B60W 2540/30; B60W 2540/00;
(Continued)

(56) References Cited

U.S. PATENT DOCUMENTS 9,766,625 B2   9/2017   Boroditsky et al.
10,077,056 B1  9/2018   Fields et al.
(Continued)

OTHER PUBLICATIONS

J. Healey and R. Picard, "Detecting Stress During Real-World Driving Tasks Using Physiological Sensors", 2005 https://affect.media.mit.edu/pdfs/05.healey-picard.pdf.
(Continued)

*Primary Examiner* — Michael V Kerrigan
(74) *Attorney, Agent, or Firm* — Fox Rothschild LLP

(57) ABSTRACT

Systems and methods for controlling a fully or semi autonomous vehicle. The methods comprise: receiving first sensor information specifying a person's emotion and physiological response to the autonomous vehicle's operation, or a person's general mood; predicting a first mood of the person based on at least one of the first sensor information and demographic information indicating a level of distrust, fear, anxiety or stress relating or not relating to autonomous vehicles by people having at least one characteristic in common; selecting a first vehicle operational mode from a plurality of pre-defined vehicle operational modes based on the predicted first mood of the person; and causing control of the autonomous vehicle in accordance with rules associated with the selected first vehicle operational mode.

26 Claims, 9 Drawing Sheets

(51) Int. Cl.
*B60K 28/00* (2006.01)
*G06K 9/00* (2006.01)
(52) U.S. Cl.
CPC ....... G05D 1/0088 (2013.01); G06K 9/00845 (2013.01); *G05D 2201/0213* (2013.01)
(58) Field of Classification Search
CPC .. B60K 28/00; G06K 9/00845; G05D 1/0055; G05D 1/0088; G05D 2201/0213
See application file for complete search history.

(56) References Cited

U.S. PATENT DOCUMENTS

| | | | |
|---|---|---|---|
| 2010/0256852 A1* | 10/2010 | Mudalige | G08G 1/22 701/24 |
| 2015/0106289 A1 | 4/2015 | Basir et al. | |
| 2017/0174221 A1 | 6/2017 | Vaughn et al. | |
| 2017/0297586 A1 | 10/2017 | Li | |
| 2018/0122160 A1 | 5/2018 | Heredia et al. | |
| 2018/0307228 A1 | 10/2018 | Smith et al. | |
| 2018/0335785 A1 | 11/2018 | Miller et al. | |
| 2019/0031145 A1* | 1/2019 | Trelin | B60W 40/08 |
| 2019/0071100 A1* | 3/2019 | Xavier | B60W 30/10 |
| 2019/0129422 A1 | 5/2019 | Nojoumian | |
| 2019/0337532 A1* | 11/2019 | Myers | B60W 30/18 |

OTHER PUBLICATIONS

G. F. Wilson, J. D. Lambert, and C. A. Russell, "Performance enhancement with real-time physiologically controlled adaptive aiding," Proceedings of the Human Factors and Ergonomics Society 46th Annual Meeting, vol. 3, pp. 61-64, 1999.

H. S. Shin, et al., "Real Time Car Driver's Condition Monitoring System," IEEE, Sensors 2010.

* cited by examiner

ADAPTIVE MOOD CONTROL IN SEMI OR FULLY AUTONOMOUS VEHICLES

CROSS-REFERENCE TO RELATED APPLICATIONS

The present application claims the benefit of U.S. Patent Ser. No. 62/580,223 filed Nov. 1, 2017. This patent application is hereby incorporated by reference in its entirety.

BACKGROUND

Statement of the Technical Field

The present disclosure relates generally to vehicles. More particularly, the present disclosure relates to implementing systems and methods for controlling operations of semi and/or fully autonomous vehicles based on machine-learned human mood(s).

Description of the Related Art

Recent studies indicate that people have negative attitudes toward utilizing autonomous platforms such as self-driving cars—according to recent findings by researchers, Americans expressed one of the highest levels of fear about technology such as robotic systems and self-driving cars. There is a need to address peoples' concerns about autonomous vehicles.

SUMMARY

The present disclosure concerns implementing systems and methods for controlling a fully or semi autonomous vehicle. The method comprising: receiving, by a computing device from at least one sensing device, first sensor information specifying (A) at least one of a person's emotion and physiological response to the fully or semi autonomous vehicle's operation, or (B) a person's general mood in that moment; predicting, by the computing device, a first mood of the person based on at least one of the first sensor information and demographic information indicating a level of distrust, fear, anxiety or stress relating or not relating to autonomous vehicle operation by people having at least one characteristic in common; selecting, by the computing device, a first vehicle operational mode from a plurality of pre-defined vehicle operational modes based on the predicted first mood of the person; causing, by the computing device, control of the autonomous vehicle in accordance with rules associated with the selected first vehicle operational mode; and/or storing at least one of information specifying actions taken by the fully or semi autonomous vehicle while in the selected first vehicle operational mode.

In some scenarios, the computing device also receives user software interactions for inputting simple expressions describing how the person is feeling about the fully or semi autonomous vehicle's operation, or how the person is feeling in general in that moment. The first mood is predicted further based on the simple expressions and/or sensor information. Additionally or alternatively, the first mood is predicted further based on machine-learned patterns or emotion of people riding in vehicles, and/or natural language processing technology (in addition to sensory information) to interpret at least one of recorded human speech and simple expression inputs.

In those or other scenarios, an emergency-awareness feature is provided that reports at least one of medically-abnormal states or life-threatening states to emergency units. Additionally or alternatively, the sensing device comprises at least one of a heart rate sensor, a skin perspiration sensor, a facial temperature sensor, a gesture detection sensor, a blinking rate detection sensor, a camera, and a microphone. The sensing device is coupled to the person or disposed in the fully or semi autonomous vehicle so as to be located adjacent to the person while riding in the fully or semi autonomous vehicle.

In those or yet other scenarios, the methods further comprise: predicting a second mood of the person based on at least one of the second sensor information generated by at least one sensing device or another sensing device; selecting a second vehicle operational mode from a plurality of pre-defined vehicle operational modes based on the predicted second mood of the person; and causing an operational mode of the fully or semi autonomous vehicle to transition from the first vehicle operational mode to the second vehicle operational mode. The operations of the fully or semi autonomous vehicle are controlled in accordance with rules associated with the second vehicle operational mode and not with the rules associated with the first vehicle operation mode during a given period of time. Additionally or alternatively, operational modes and parameter values are exchanged with adjacent vehicles for achieving objectives of an Adaptive Mood Control ("AMC") module of the computing device and objectives of the fully or semi autonomous vehicle.

BRIEF DESCRIPTION OF THE DRAWINGS

The present solution will be described with reference to the following drawing figures, in which like numerals represent like items throughout the figures.

DETAILED DESCRIPTION

Figure 1:
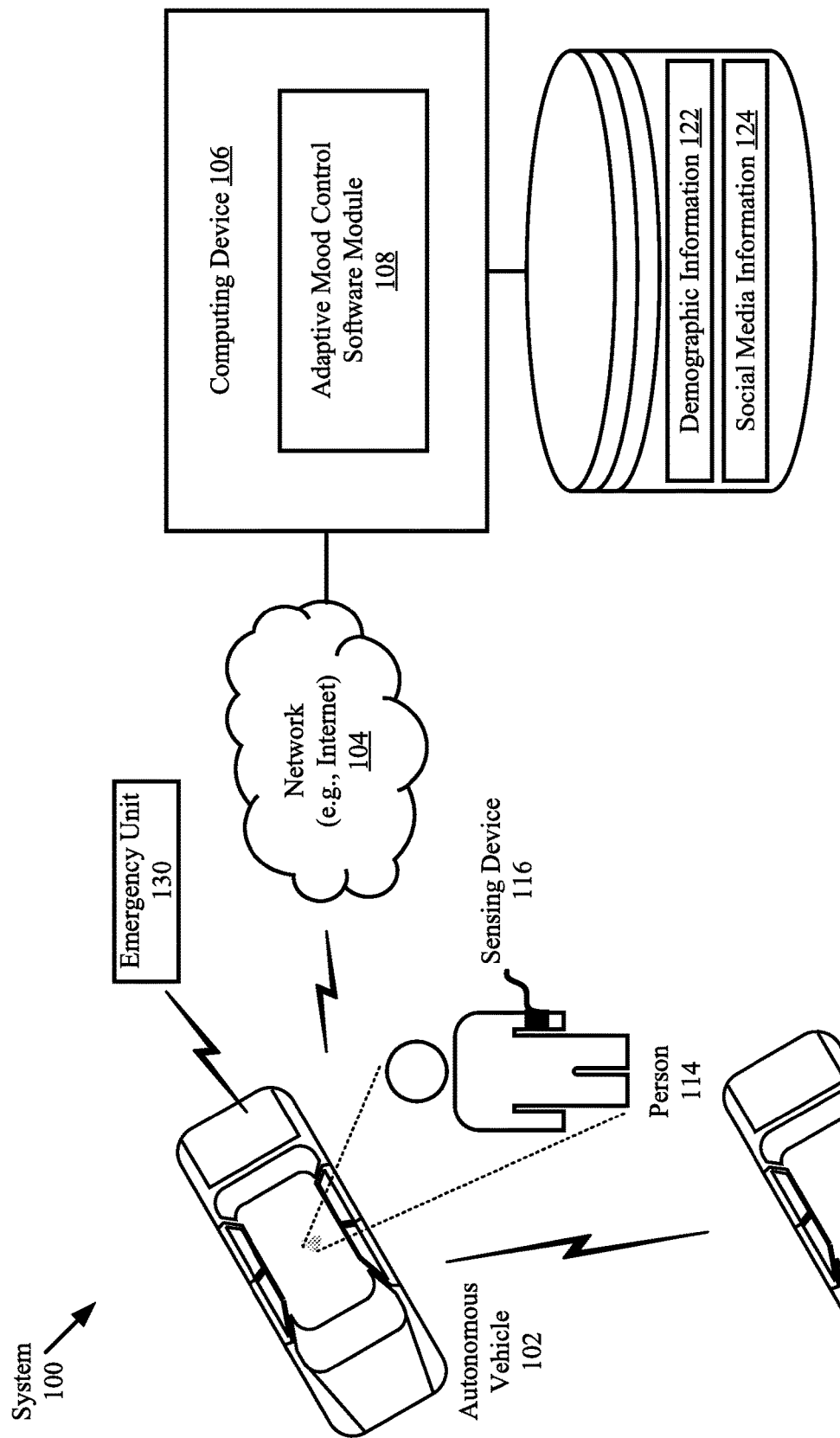
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, recent studies indicate that people have negative attitudes toward utilizing autonomous platforms such as self-driving cars. This interesting discovery highlights the necessity and urgency of developing new technologies by which autonomous systems become responsive to human trust, distrust, anxiety, fear, as well as the general feeling of the person who is interacting with the autonomous system. The present solution therefore provides a novel technology to address the aforementioned problem.

The present solution generally concerns implementing systems and methods for controlling operations of semi and/or fully autonomous vehicles based on machine-learned human mood(s). The Adaptive Mood Control ("AMC") predicts a person's mood using learning mechanisms in real-time and then adaptively control an autonomous vehicle to be responsive to the predicted mood. In other words, a state of the mind is analyzed and predicted in terms of trust, distrust, fear, anxiety, happiness, etc. in regards to the autonomous vehicle's operation and/or behavior as well as the general feeling of the person. Accordingly, one of the three modes of operation (i.e., cautious, normal, and alert) is utilized. In this context, the autonomous vehicle can include, but is not limited to, a self-driving car, an autonomous military vehicle, or other semi or fully autonomous system.

For instance, the AMC is responsive to trust. As such, the AMC tries to establish trust in initial interactions (cautious operation mode), sustain it over time (normal operation mode), and rebuild it in the case of incidental failures (alert operation mode) by employing or avoiding a certain class of actions (trust-building or trust-damaging) in each mode of operation. The AMC utilizes supervised and/or unsupervised learning modules to process collected data for a proper prediction and response. The response can include, but is not limited to, the operation mode as well as a change in illumination, sounds, decoration/gesture, etc. The data is collected (in)-directly (hybrid) or indirectly (objective) through human expressions, intrusive (e.g., galvanic skin response embedded into the seats/handles) and non-intrusive (e.g., visible-light and thermal cameras) devices.

Notably, when the autonomous systems perceive the human's mood in real-time and then adaptively control their behaviors to be responsive to the perceived moods, the human trust, and consequently, comfort level are increased while the level of anxiety and fear are decreased. The present solution therefore provides a convenient, pleasant, and more importantly, trustworthy experience for humans who interact with autonomous vehicles. It is worth mentioning that the proposed solution can be utilized in a wide range of autonomous systems, including but not limited to, self-driving cars, autonomous military vehicles, autonomous airplanes or helicopters, social or sexual robots.

Referring now to FIG. 1, there is provided an illustration of an illustrative system 100. System 100 is generally configured to control operations of autonomous vehicles based on machine-learned human mood(s) and/or emotion(s). The machine-learned human mood(s) and/or emotion(s) can be related to and/or unrelated to the autonomous vehicle's operation.

System 100 is not limited to the architecture shown in FIG. 1. System 100 can include more or less components than that shown based on a given application. In this regard, it should be understood that FIG. 1 shows a sample architecture for providing emotional awareness and the remote control of a fully automated or semi-automated vehicle 102 based on machine-learned moods and/or emotions of a person 114 located inside of the vehicle. However, the present solution need not comprise the remote control of the vehicle, but rather the local control of the vehicle. In this case, the functions and features of components 106 and/or 120 are implemented within the vehicle instead of external to the vehicle. As such, the need for network 104 would be eliminated.

As shown in FIG. 1, system 100 comprises an autonomous vehicle 102 (e.g., with an internal datastore not shown in FIG. 1), a network 104, a computing device 106 with an AMC software module 108, and a datastore 120 external to the vehicle. Any autonomous vehicle can be used herein without limitation. For example, the autonomous vehicle includes, but is not limited to, a self-driving car (as shown in FIG. 1), an autonomous military vehicle, an autonomous airplane, an autonomous helicopter, and/or an autonomous mobile robot. An illustrative system architecture for the vehicle 102 will be discussed below in relation to FIG. 2.

The vehicle 102 is generally configured to communicate data to and from the computing device 106 via the network 104 (e.g., the Internet or World Wide Web). In this way, the vehicle is registered with the system so that the vehicle's operations can be monitored and controlled by the computing device 106 in accordance with the person's predicted mood. This registration can be achieved by exchanging messages between the vehicles and the remote computing device 106 to sign-up or join a service.

The AMC software module 108 of the computing device 106 facilitates the configuration of the autonomous vehicle's operational mode. The vehicle operational modes include, but are not limited to, a normal operational mode, a cautious operational mode, and an alert operational mode. The normal operational mode is selected when no fear, anxiety, stress and/or distrust is detected for the person 114 and/or no unusual activity by the autonomous vehicle 102 and/or person 114 is detected. In the normal operational mode, the autonomous vehicle operates in accordance with its default settings. The cautious operational mode is selected when fear, anxiety, stress and/or distrust is detected for the person 114 and/or no unusual activity by the autonomous vehicle 102 and/or person 114 is detected. The alert operational mode is selected when fear, anxiety, stress and/or distrust is detected for the person 114 and/or an unusual activity by the autonomous vehicle 102 and/or person 114 is also detected. In the cautious and alert operational mode, the autonomous vehicle will operate in accordance with one or more non-default settings. For example, a default setting of the normal operational mode is to travel at a speed equal to the speed limit. The non-default setting of the cautious operational mode is to travel at a speed five miles below the speed limit, or avoid overpassing other vehicles, etc. The non-default setting of the alert operation mode is to take non-busy roads, or come to a complete stop as soon as possible. The present solution is not limited to the particulars of this example.

Each of the aforementioned operational modes has one or more pre-defined rules associated therewith for controlling operations of the autonomous vehicle. For example, a pre-defined rule of the alert mode is designed to rebuild a person's trust and/or deal with a person's fears or anxieties in relation to the vehicles behavior or a recent event (e.g., a car accident and/or an event in his/her personal life). In this regard, the rule states that (1) the speed of the autonomous vehicle is to remain below a given threshold value, (2) the vehicle should not make more than a certain number of lane changes in a given amount of time, (3) the vehicle should only use right-hand-side lanes, (4) the vehicle should take an alternative route including non-busy roads to a destination even if it is not the shortest route of a plurality of possible routes to the destination, and/or (5) the vehicle should start braking when it less than a given number of feet from the external object. The present solution is not limited to the particulars of this example.

Notably, the vehicle's operational mode is dynamically changed in response to changes in the person's predicted mood or emotional when the computing device 106 is in an AMC mode. In semi-autonomous scenarios, the rules associated with the vehicle's operational mode may cause user controls for controlling operations of the vehicle to be overridden as long as it is safe.

The person's mood or emotion is predicted by the computing device 106 using sensor data generated by one or more sensing devices 116. Each sensing device 116 is coupled to the person as shown in FIG. 1 or located adjacent to the person (e.g., located in a car seat on which the person is sitting and/or a handle of a door). The sensing device 116 includes, but is not limited to, a heart rate sensor, a skin perspiration sensor, a facial temperature sensor, a gesture detection sensor, a blinking rate detection sensor, a camera, and/or a microphone (e.g., to capture speech). Sensor data is communicated from the sensing device 116 to the AMC software module 106 for processing. An illustrative architecture for the sensing device 116 will be discussed below in relation to FIG. 3.

Other information can additionally be used by the computing device 106 to predict the person's mood or emotion. This other information can include, but is not limited to, demographic information 122 stored in a datastore 120 (e.g., a database), social media information 124, information directly inputted into the system by the person 114, and/or information indicating the person's mood/emotion in relation to the vehicle's operations or the general feeling of the person. Besides, other information can be used by the computing device 106 to adjust the operation mode of the vehicle. This other information can include, but is not limited to, operational information received from one or more adjacent vehicles 126, i.e., self-driving or human-driving vehicles, or road and traffic information.

The demographic information 122 can include, but is not limited to, information indicating different levels of distrust, fear, anxiety and/or stress relating to autonomous vehicles and/or certain events by people having particular characteristics (e.g., age, race, nationality, etc.). For example, the demographic information 122 includes information indicating a first level of distrust of autonomous vehicles by young people (e.g., people with ages less than 35), information indicating a second level of distrust of autonomous vehicles by middle aged people (e.g., people with ages between 35 and 65), and information indicating a third level of distrust of autonomous vehicles by older people (e.g., people with ages greater than 65). The first, second and third levels of distrust are different from each other. The present solution is not limited to the particulars of this example. An illustrative architecture for the computing device 106 will be discussed below in relation to FIG. 4.

During operation, the person 114 initially has the option to activate the AMC mode of the computing device 106. In response to a user software interaction selecting the AMC mode, the computing device 106 transitions from the inactive-AMC-mode to the active-AMC-mode in which the AMC software module 108 is enabled. The AMC software module 108 provides two learning options, namely a supervised machine learning option and an unsupervised machine learning option.

In the supervised machine learning case, the person's mood is predicted based on user-inputted information in addition to the sensor data, demographic data 122 and/or social media data 124. The user inputted information can include, but is not limited to, simple expressions (e.g., worried, anxious, scared, fine, etc.). Natural language processing technology is used to interpret the user inputs. In the unsupervised machine learning case, user inputted information is not used to predict the person's mood or emotion.

The person's predicted mood or emotion is then used by the AMC software module 108 to select and set a proper mode of operation for the autonomous vehicle from a plurality of pre-defined vehicle operational modes (e.g., a normal operational mode, a cautious operational mode, and an alert operational mode). Thereafter, the AMC software module 108 and electronics of the autonomous vehicle collectively enforce rules in accordance with the newly set vehicle operational mode. Information specifying actions taken to enforce the rules is stored in a memory of the autonomous vehicle, the computing device 106 and/or the datastore 120.

One of the major issues with the technology of the fully or semi autonomous vehicles is that they may not be able to accurately predict the behavior of other self-driving and human-driving vehicles. This predication is essential to properly navigate autonomous vehicles on roads. This is more critical when it comes to human-driving cars due to unexpected decisions by drivers. Therefore, vehicle 102 and other adjacent vehicles 126, self-driving or human-driving vehicles, can exchange information regarding their operational modes and parameter values so that, not only the AMC module can accomplish its objectives but also the autonomous vehicle can be navigated properly by using this auxiliary information. In other words, in some scenarios, the rules and/or parameter values thereof (e.g., speed) are dynamically modified based on operational information sent/received to/from adjacent vehicles 126. Broadcast communications can be used to communicate operational information between vehicles. Each vehicle may broadcast information therefrom in response to its detection of another vehicle in proximity (e.g., within 50-100 feet) thereof.

In those or other scenarios, the person's predicted mood or emotion is additionally used to control operations, parameters and/or settings of auxiliary devices of the vehicle 102. The auxiliary devices include, but are not limited to, radios, lights, displays and/or any other entertainment system.

In any scenario, if at least one medically-abnormal and/or life-threatening state is observed by sensing device 116 (e.g., an abnormal heart rate), then this information will be broadcast to emergency units (e.g., 911) 130 or any relevant unit.

Figure 2:
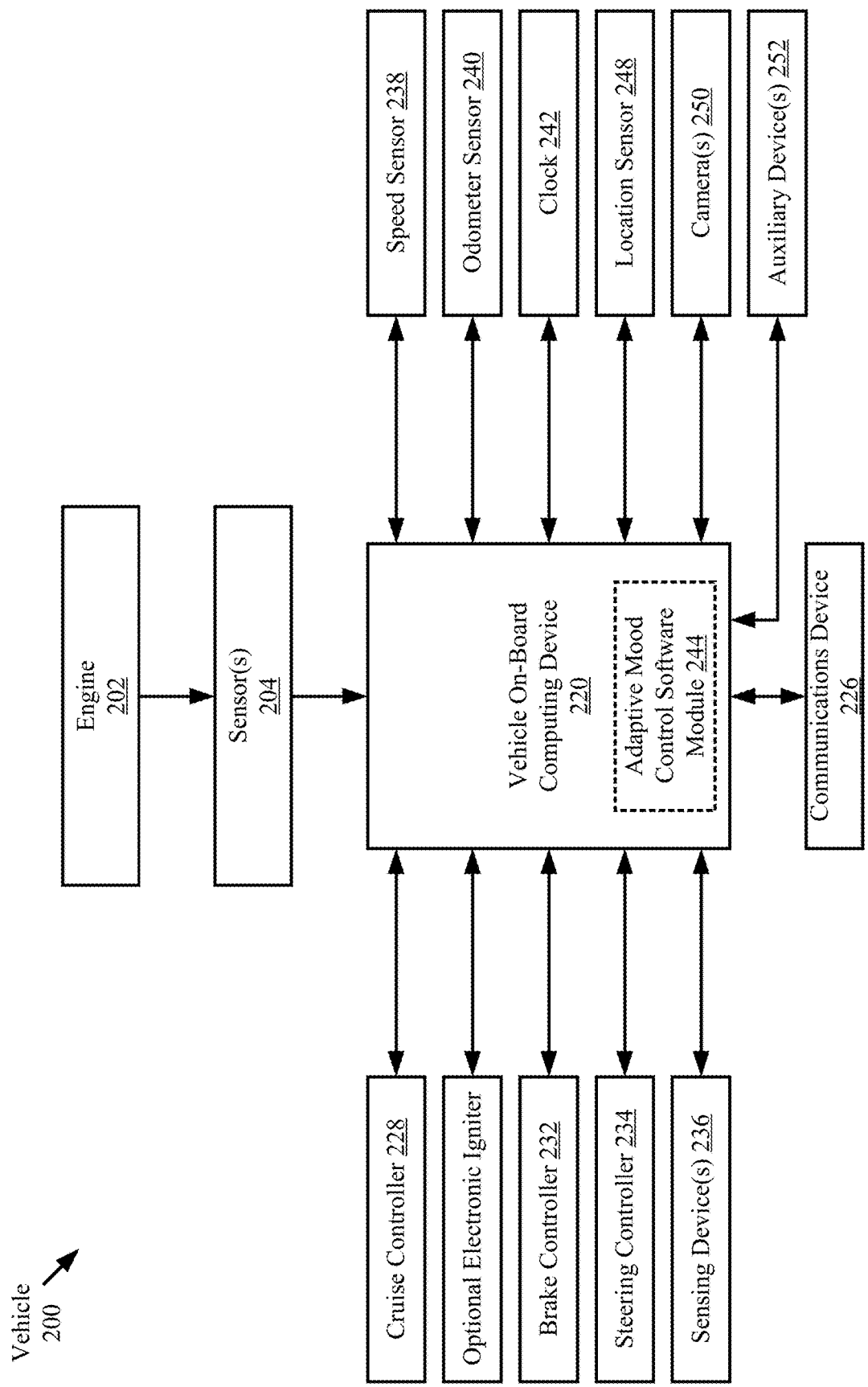
FIG. 2 is an illustration of an illustrative architecture for a vehicle.

Referring now to FIG. 2, there is provided an illustration of an illustrative system architecture 200 for a vehicle. Vehicle 102 of FIG. 1 can have the same or similar system architecture as that shown in FIG. 2. Thus, the following discussion of system architecture 200 is sufficient for understanding vehicle 102 of FIG. 1.

As shown in FIG. 2, the system architecture 200 comprises a vehicle on-board computing device 220 connected to a communication device 226. The communication device 226 is configured to facilitate wired and/or wireless communications with external devices (e.g., computing device 106 of FIG. 1). In this regard, the communication device 226 includes a transceiver and an antenna. Any known or to be known transceiver and antenna can be used herein. For example, a radio transceiver and a radio antenna can be used here.

The communication device 226 allows for telemetry of vehicle related information. The vehicle 200 includes an engine 202 and a plurality of sensors 204 measuring various parameters of the engine 202. Still, it should be noted that the sensors 204, in some examples, comprise an exhaust gas sensor, an engine knock sensor, an oil pressure sensor, an engine temperature sensor, a battery voltage sensor, an alternator current sensor, an engine RPM sensor, and a throttle position sensor. Other sensors 236, 238, 240, 248, 250 are also provided in the vehicle 200. These sensors include sensing device(s) 236, a speed sensor 238, an odometer sensor 240, a location sensor 248 (e.g., a GPS device), and camera(s) 250. The sensing device(s) 236 can be disposed in, on or adjacent to a car seat, a door handle, a steering wheel, a dash board, or any other surface of an autonomous vehicle which a person may come in contact with while therein. The sensing device(s) 236 include(s), but is(are) not limited to, a heart rate sensor, a skin perspiration sensor, a facial temperature sensor, a gesture detection sensor, a blinking rate detection sensor, a camera, and/or a microphone (e.g., to capture speech).

During operations, measurement information is communicated from sensor 236 to the vehicle on-board computing device 220. The vehicle on-board computing device 220 forwards the measurement data to a remote computing device (e.g., computing device 106 of FIG. 1) via communications device 226 and/or locally analyzes the measurement data from the sensor 236 for purposes of predicting the mood of a person riding in the autonomous vehicle. The operational mode of the autonomous vehicle 200 is then set based on the predicted mood of the person.

Measurement information is also communicated from the sensors 204, 238, 240, 248, 250 to the vehicle on-board computing device 220. The vehicle on-board computing device 220 analyzes the measurement data from the sensors 204, 238, 240, 248, 250, and optionally controls operations of the vehicle and/or auxiliary device(s) 252 based on results of the analysis. For example, the vehicle on-board computing device 220 controls braking via a brake controller 232, a vehicle speed via cruise controller 228, and/or a vehicle direction via steering controller 234 in accordance with a rule associated with its current vehicle operational mode selected based on the predicted mood of a person (e.g., person 114 of FIG. 1).

The operating system 222 is configured to support the vehicle on-board computing device's basic functions, such as scheduling tasks and executing applications. The AMC software module 244 is a computer program that implements all or a portion of the methods described herein for controlling an autonomous vehicle based on a predicted mood of a person. The operations of the AMC software module 244 are the same as or similar to the AMC software module 108 of FIG. 1, and will become evident as the discussion progresses. The clock 242 is an electrical device for measuring time.

Vehicle history information is logged in a memory (not shown in FIG. 2) of the vehicle on-board computing device 220, or an external datastore (e.g., datastore 120 of FIG. 1). The vehicle history information includes historical data related to the vehicle, and can be used to determine whether or not the vehicle operated appropriately in view of a person's mood or change in mood. A unique identifier is provided for the vehicle. The vehicle history information is stored so as to be associated with the unique vehicle identifier. The unique vehicle identifier can include numbers, letters, symbols or a combination of the same.

Figure 3:
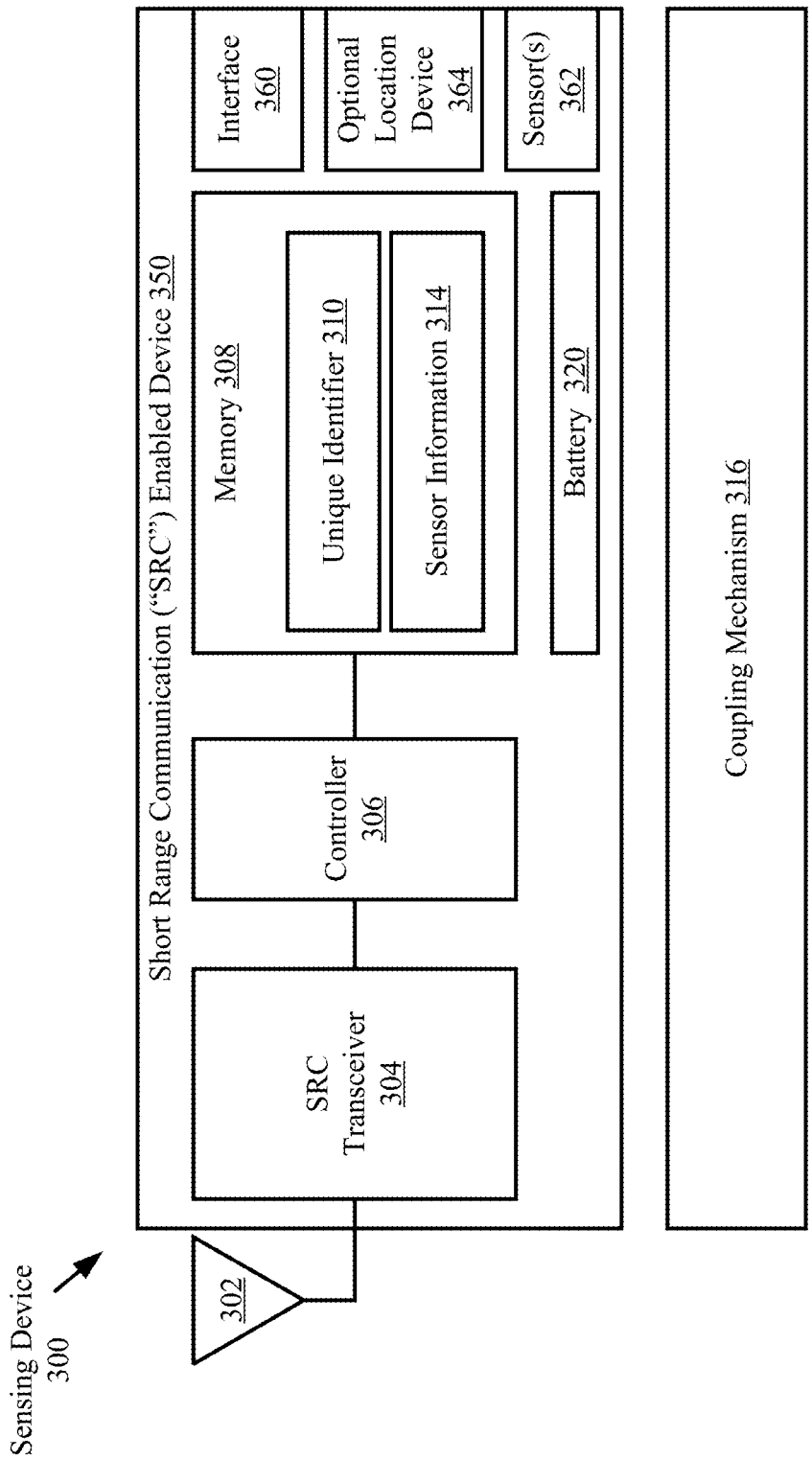
FIG. 3 is an illustration of an illustrative architecture for a sensing device.

Referring now to FIG. 3, there is provided a schematic illustration of an illustrative architecture for a sensing device 300. Sensing device 116 of FIG. 1 and/or sensing device(s) 236 of FIG. 2 can be the same as or similar to sensing device 300. As such, the discussion of sensing device 300 is sufficient for understanding sensing devices 116, 236.

Sensing device 300 can include more or less components than that shown in FIG. 3. However, the components shown are sufficient to disclose an illustrative embodiment implementing the present solution. Some or all of the components of the sensing device 300 can be implemented in hardware, software and/or a combination of hardware and software. The hardware includes, but is not limited to, one or more electronic circuits.

The hardware architecture of FIG. 3 represents an illustration of a representative sensing device 300 configured to facilitate operational control of semi and/or fully autonomous vehicles based on machine-learned human mood(s). In this regard, the sensing device 300 comprises an antenna 302 and a Short Range Communication ("SRC") enabled device 350 for allowing data to be exchanged with the external device via SRC technology. The components 304-308, 360, 362, 364 and a battery 320 may be collectively referred to herein as the SRC enabled device 150. The SRC enabled device 350 is coupled to an antenna 302. The antenna 302 is configured to receive SRC signals from the external device and transmit SRC signals generated by the SRC enabled device 350. The SRC enabled device 350 comprises an SRC transceiver 304. SRC transceivers are well known in the art, and therefore will not be described herein. However, it should be understood that the SRC transceiver 304 processes received SRC signals to extract information therein. This information can include, but is not limited to, a request for certain information (e.g., a unique identifier 310 and/or sensor information 314). The SRC transceiver 304 may pass the extracted information to the controller 306.

If the extracted information includes a request for certain information, then the controller 306 may perform operations to retrieve a unique identifier 310 and/or sensor information 314 from memory 308. The sensor information 314 can include information indicating a detected skin perspiration, facial temperature, gesture, blinking rate, appearance, and/or sound (e.g., capture speech). The retrieved information is then sent from the sensing device 300 to a requesting external device (e.g., computing device 106 of FIG. 1) via an SRC communication.

The SRC enabled device 350 also comprises an interface 360, an optional location device 364, and sensor(s) 362. The interface 360 can include input devices and output devices, which facilitate user-software interactions for controlling operations of the sensing device 300. The input devices include, but are not limited, a physical and/or touch keyboard. The input devices can be connected to the sensing device 300 via a wired or wireless connection (e.g., a Bluetooth® connection). The output devices include, but are not limited to, a speaker, a display, and/or light emitting diodes. Interface 360 is also configured to facilitate wired or wireless communications to and from external devices.

In some scenarios, the connections between components 304, 306, 308, 360, 362, 364 are unsecure connections or secure connections. The phrase "unsecure connection", as used herein, refers to a connection in which cryptography and/or tamper-proof measures are not employed. The phrase "secure connection", as used herein, refers to a connection in which cryptography and/or tamper-proof measures are employed. Such tamper-proof measures include enclosing the physical electrical link between two components in a tamper-proof enclosure.

Notably, the memory 308 may be a volatile memory and/or a non-volatile memory. For example, the memory 308 can include, but is not limited to, a Random Access Memory ("RAM"), a Dynamic Random Access Memory ("DRAM"), a Static Random Access Memory ("SRAM"), a Read-Only Memory ("ROM"), a flash memory and/or solid-state drive. The memory 308 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The coupling mechanism 316 is configured to couple the sensing device 300 to an object or person. In this regard, the coupling mechanism 316 includes, but is not limited to, a screw, a bolt, an adhesive, a lock, a latch, a weld, a chemical bond, and/or any other coupling means.

As shown in FIG. 2, the sensing device 300 also comprises one or more sensors 362. The sensors 362 can facilitate the determination of a predicted mood for a person. In this regard, the sensors include, but are not limited to, a heart rate sensor, a skin perspiration sensor, a facial temperature sensor, a gesture detection sensor, a blinking rate detection sensor, a camera, and/or a microphone (e.g., to capture speech).

Figure 4:
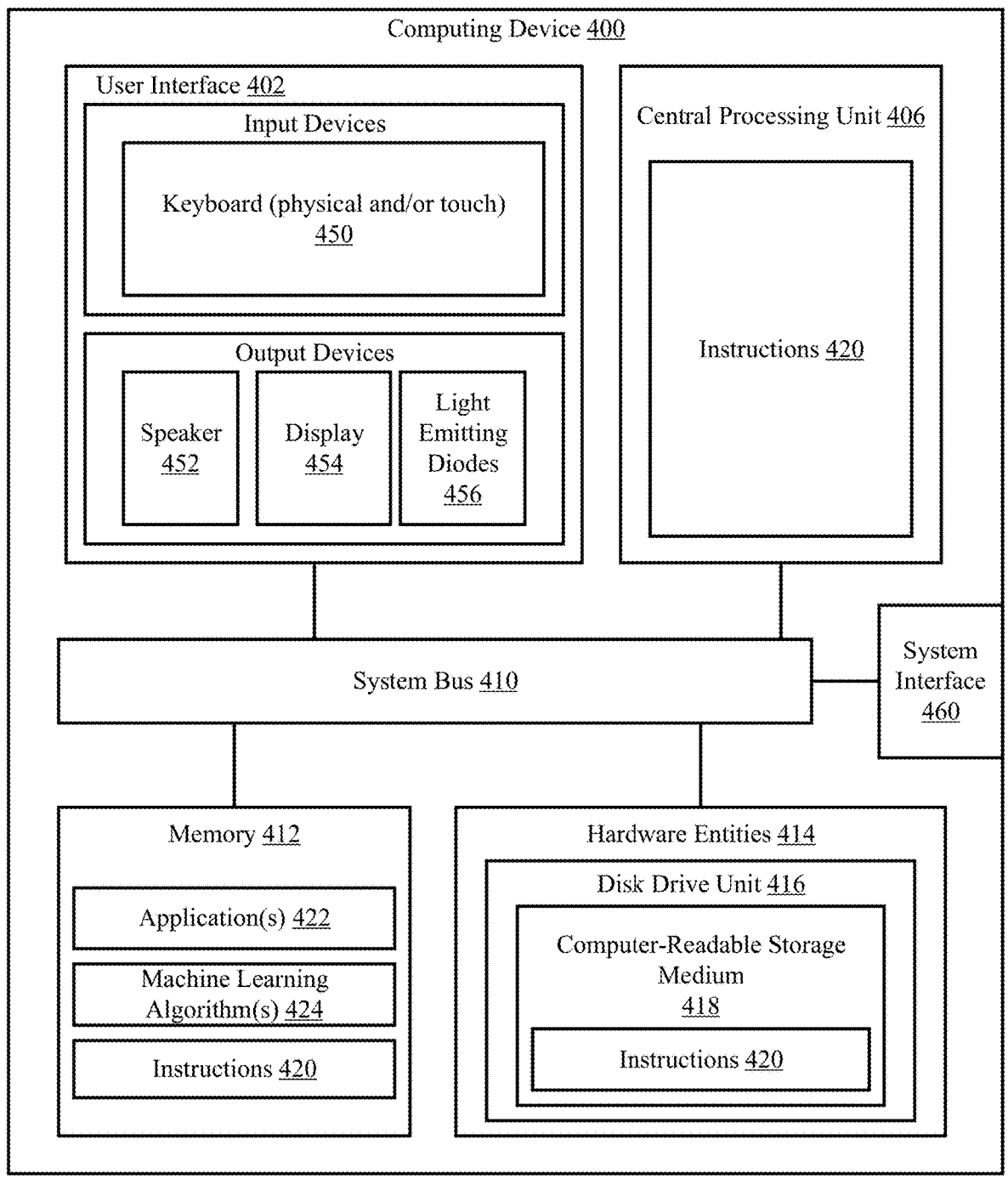
FIG. 4 is an illustration of an illustrative architecture for a computing device.

Referring now to FIG. 4, there is provided an illustration of an illustrative architecture for a computing device 400. Computing device 106 of FIG. 1 and/or vehicle on-board computing device 220 of FIG. 2 is (are) the same as or similar to computing device 400. As such, the discussion of computing device 400 is sufficient for understanding these components of system 100 and/or vehicle 200.

In some scenarios, the present solution is used in a client-server architecture. Accordingly, the computing device architecture shown in FIG. 4 is sufficient for understanding the particulars of client computing devices and servers.

Computing device 400 may include more or less components than those shown in FIG. 4. However, the components shown are sufficient to disclose an illustrative solution implementing the present solution. The hardware architecture of FIG. 4 represents one implementation of a representative computing device configured to provide an improved item return process, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Radom Access Memory ("RAM"), a solid-state or disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Computing device 400 implements machine learning technology. In this regard, computing device 400 runs one or more software applications 422 for facilitating the purchase of articles based on machine-learned information thereabout. The software algorithms 422 use machine learning algorithms 424 to learn characteristics of people associated with semi-autonomous vehicles and/or fully autonomous vehicles. This learned information can be used for various purposes as described herein. For example, an image of a person riding in an autonomous vehicle (e.g., autonomous vehicle 100 of FIG. 1) can be captured and processed to extract features of the person. The extracted features are compared to learned features of a person associated with stress, anxiety, fear, and/or distrust. The learned features were obtained using historical sensor data of other people and/or the same person who rode in the same or different autonomous vehicle and/or who had the same and/or different experience while riding in the autonomous vehicle. The present solution is not limited to the particulars of this example.

Figure 5:
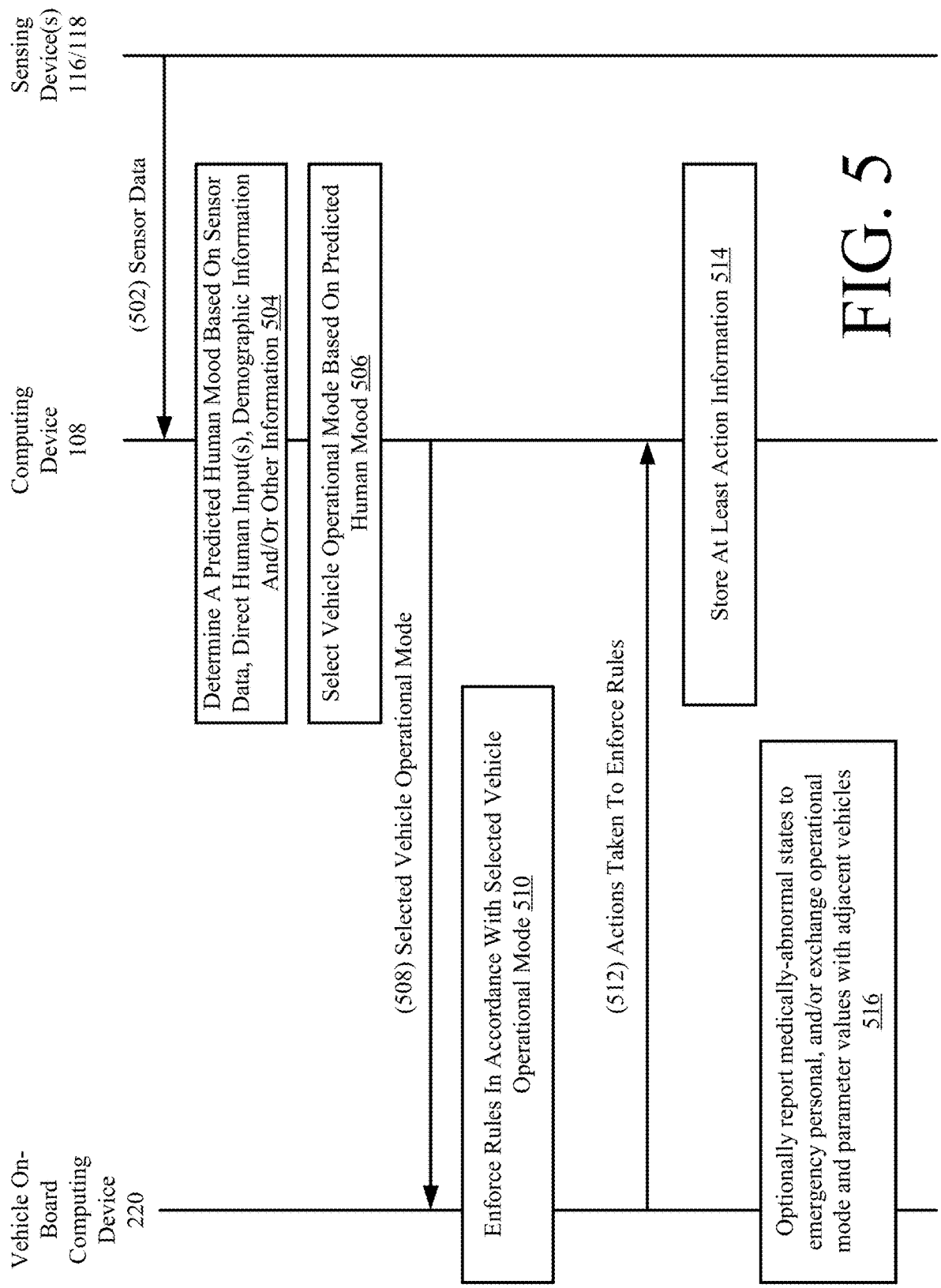
FIG. 5 is an illustration of an illustrative message flow for the system of FIG. 1.

Referring now to FIG. 5, there is provided a message flow for system 100. As shown by 502, one or more sensing devices 116, 118 generates sensor data and communicates the same to a computing device 108. Next in 504, the computing device 108 performs operations to determine a predicted human mood based on the received sensor data (e.g., sensor information 314 of FIG. 3), direct human input(s), demographic information (e.g., demographic information 122 of FIG. 1), social media information (e.g., social medial information 124 of FIG. 1), and/or any other information. The predicted human mood can be determined by analyzing the person's state of mind in terms of trust, distrust, fear, anxiety and/or happiness in relation to an autonomous vehicle's operation and behavior, or in relation to the person's general feeling. This analysis can involve using (1) historical information by a machine learning algorithm to learn patterns or behaviors of people riding in vehicles and/or (2) natural language processing technology to interpret human speech and/or simple expression inputs. Any machine-learning algorithm can be used herein without limitation. For example, one or more of the following machine learning algorithms is employed here: supervised learning; unsupervised learning; semi-supervised learning; and reinforcement learning. These patterns or behaviors can then be used to predict the person's mood at any given time. For example, the historical information can be analyzed using the above machine learning techniques, and the results of such analysis can be used to predict whether the person is scared, anxious, and/or happy. The machine-learned patterns or behaviors of people riding in vehicles can be stored in a local memory of the vehicle, a local memory (e.g., memory 412 of FIG. 4) of the computing device 108, and/or in a remote datastore (e.g., datastore 120 of FIG. 1).

As shown by 506, the computing device 108 then selects a vehicle operational mode from a plurality of vehicle operational modes based on the predicted human mood. The vehicle operational modes include, but are not limited to, a normal operational mode, a cautious operational mode, and an alert operational mode. In the normal operational mode, the autonomous vehicle will operate in accordance with its default settings. In the cautious and alert operational mode, the autonomous vehicle will operate in accordance with one or more non-default settings (e.g., for speed, braking, steering, path of travel, etc.). A message is sent in 508 from the computing device 108 to the vehicle on-board computing device 220. In the message, the selected vehicle operational mode is identified. The message can include, but is not limited to, a push notification. As known in the art, a push notification comprises a message that is sent from one device to another at any time.

In response to the message, the computing device 108 and the vehicle on-board computing device 220 perform operations in 510 to enforce rules in accordance with the selected vehicle operational mode. Therefore, the autonomous vehicle and other adjacent vehicles, self-driving or human-driving vehicles, can exchange information regarding their operational modes and parameter values so that, not only the AMC module can accomplish its objectives but also the autonomous vehicle can be navigates properly by using this auxiliary information. Notably, the rules and/or parameter values for the rules can be dynamically modified based on operational information sent/received to/from adjacent vehicles (e.g., vehicle 126 of FIG. 1).

The rule enforcement of 510 can be achieved by performing operations by an AMC module 108 to subscribe to at least one event (e.g., an action or occurrence of recognized software). The AMC software module 108 of FIG. 1 can select the one or more events for subscription based on the particulars of the rules associated with the selected vehicle operational mode. This subscription can involve communicating a request for information to the vehicle's Operating System ("OS") (e.g., pulling) or modifying the behavior of the OS to forward sensor data to the AMC software module (e.g., hooking). When the vehicle OS detects an event (e.g., the reception of sensor data), it generates and sends a message to the AMC software module (e.g., push notification or hook triggered). This message includes information indicating the event occurrence and sensor data specifying measured parameter values (e.g., speed). At the AMC software module, the measured parameters are compared against rule settings. For example, if a rule states that the vehicle should be slowed down when the speed exceeds 65 miles per hour, then the comparison involves comparing the measured speed value to the speed value of 65 miles per hour. Results of this comparison are then used in to determine if an action needs to be taken (e.g., for example, slow down the vehicle speed via brakes or gear shifting). If so, the action is identified (e.g., apply brakes or shift gears) and a control message is generated by the AMC software module. The control message is sent from the AMC software module to the vehicle OS. The vehicle OS controls operations of the vehicle in accordance with the contents of the control message. For example, the current speed of the vehicle is compared against a pre-defined speed threshold value. If the current speed value exceeds the pre-defined speed threshold value, then an action is taken such as causing the vehicles speed to be reduced to a value below the pre-defined speed threshold value. This reduction in speed overrides any user action to control the vehicles speed. The present solution is not limited to the particulars of this example.

The vehicle on-board computing device 220 notifies the computing device 108 of the action taken to enforce the rule(s), as shown by 512. Measured parameters can be provided with the notification message. This action information and/or measured parameter information is stored in 514. The action information and/or measured parameter information can be stored in a local memory of the vehicle, a local memory (e.g., memory 412 of FIG. 3) of the computing device 106, or in a remote datastore (e.g., datastore 120 of FIG. 1). This stored information defines historical information for the vehicle. This historical information and/or other information (e.g., natural language word associations) can be used as noted above to determine a predicted mood of the person or another person.

Further optional operations can also be performed by the vehicle on-board computing device 220 as shown 516. For example, the vehicle on-board computing device 220 can report medically-abnormal states to emergency personnel, and/or exchange operational mode and parameter values with adjacent vehicles. The present solution is not limited to the particulars of 516. In some scenarios, these optional operations are additionally or alternatively performed by the computing device 108.

Figure 6:
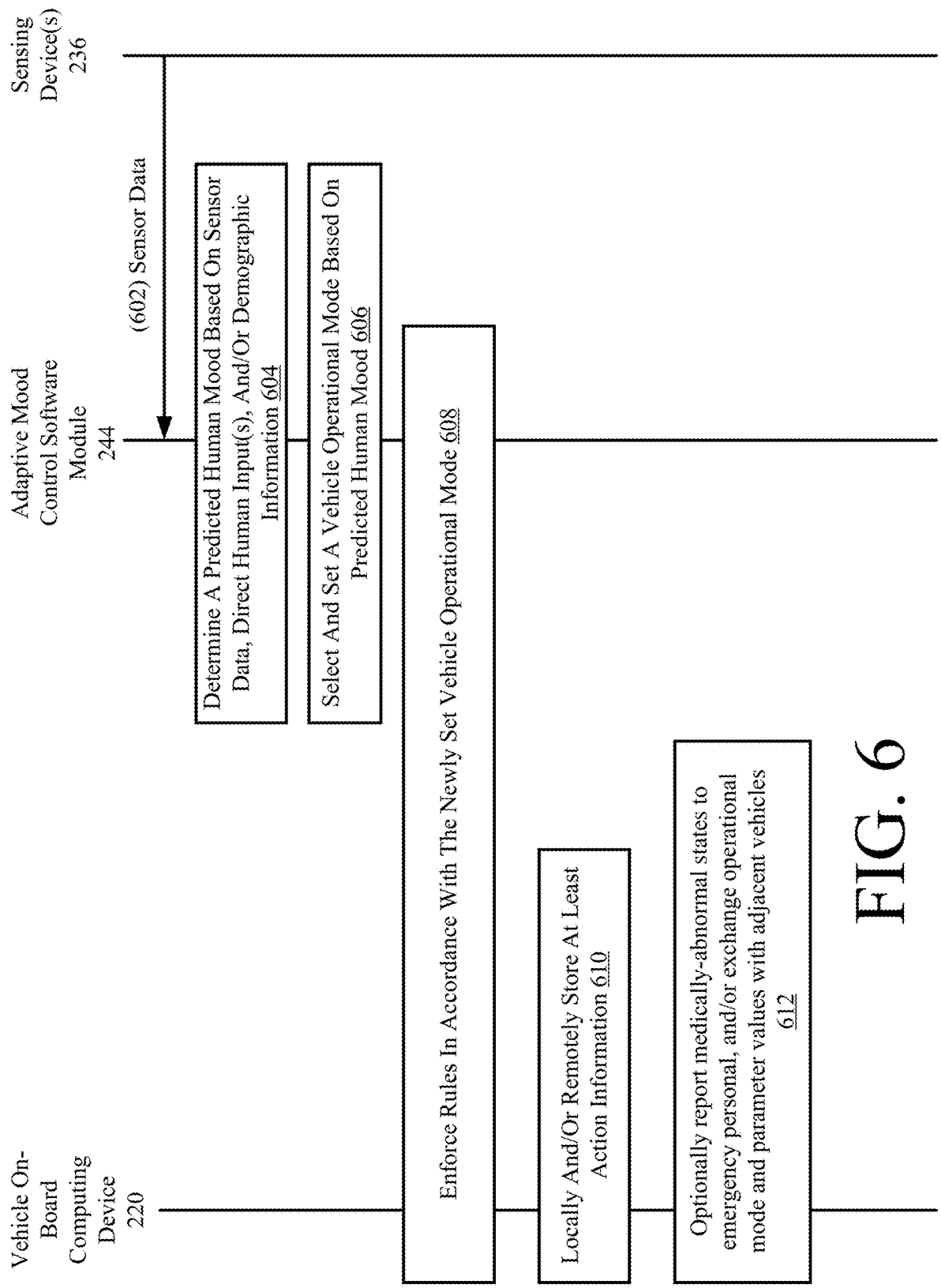
FIG. 6 is an illustration of an illustrative message flow for the system of FIG. 1.

Referring now to FIG. 6, there is provided a message flow for a system configured to control an autonomous vehicle based on a person's predicted mood. As shown by 602, one or more sensing devices 236 of the autonomous vehicle 200 generates sensor data and communicates the same to the AMC software module 244 of the autonomous vehicle 200. Next in 604, the AMC software module 244 performs operations to determine a predicted human mood based on the received sensor data (e.g., sensor information 314 of FIG. 3), direct human input(s) and/or demographic information (e.g., demographic information 122 of FIG. 1). The predicted human mood can be determined by analyzing the person's state of mind in terms of trust, distrust, fear, anxiety and/or happiness in relation to an autonomous vehicle's operation and behavior, or in relation to the person's general feeling. This analysis can involve using (1) historical information by a machine learning algorithm to learn patterns or behaviors of people riding in vehicles and/or (2) natural language processing technology to interpret human speech and/or simple expression inputs, as described above in relation to FIG. 5.

As shown by 606, the AMC software module 244 then selects a vehicle operational mode from a plurality of vehicle operational modes based on the predicted human mood. The vehicle operational modes include, but are not limited to, a normal operational mode, a cautious operational mode, and an alert operational mode. In the normal operational mode, the autonomous vehicle will operate in accordance with its default settings. In the cautious and alert operational mode, the autonomous vehicle will operate in accordance with one or more non-default settings (e.g., for speed, braking, steering, path of travel, etc.).

In response to the selection of the vehicle operational mode, the AMC software module 244 and the vehicle on-board computing device 220 perform operations in 608 to enforce rules in accordance with the selected vehicle operational mode. This enforcement can be achieved in the same or similar manner as described above in relation to FIG. 5.

Action information and/or measured parameter information is stored in 610. The action information and/or measured parameter information can be stored in a local memory of the vehicle on-board computing device 220 and/or in a remote datastore (e.g., datastore 120 of FIG. 1). This stored information defines historical information for the vehicle. This historical information and/or other information (e.g., natural language word associations) can be used as noted above to determine a predicted mood of the person or another person.

Further optional operations can also be performed by the vehicle on-board computing device 220 as shown 612. For example, the vehicle on-board computing device 220 can report medically-abnormal states to emergency personnel, and/or exchange operational mode and parameter values with adjacent vehicles. The present solution is not limited to the particulars of 612.

Figure 7:
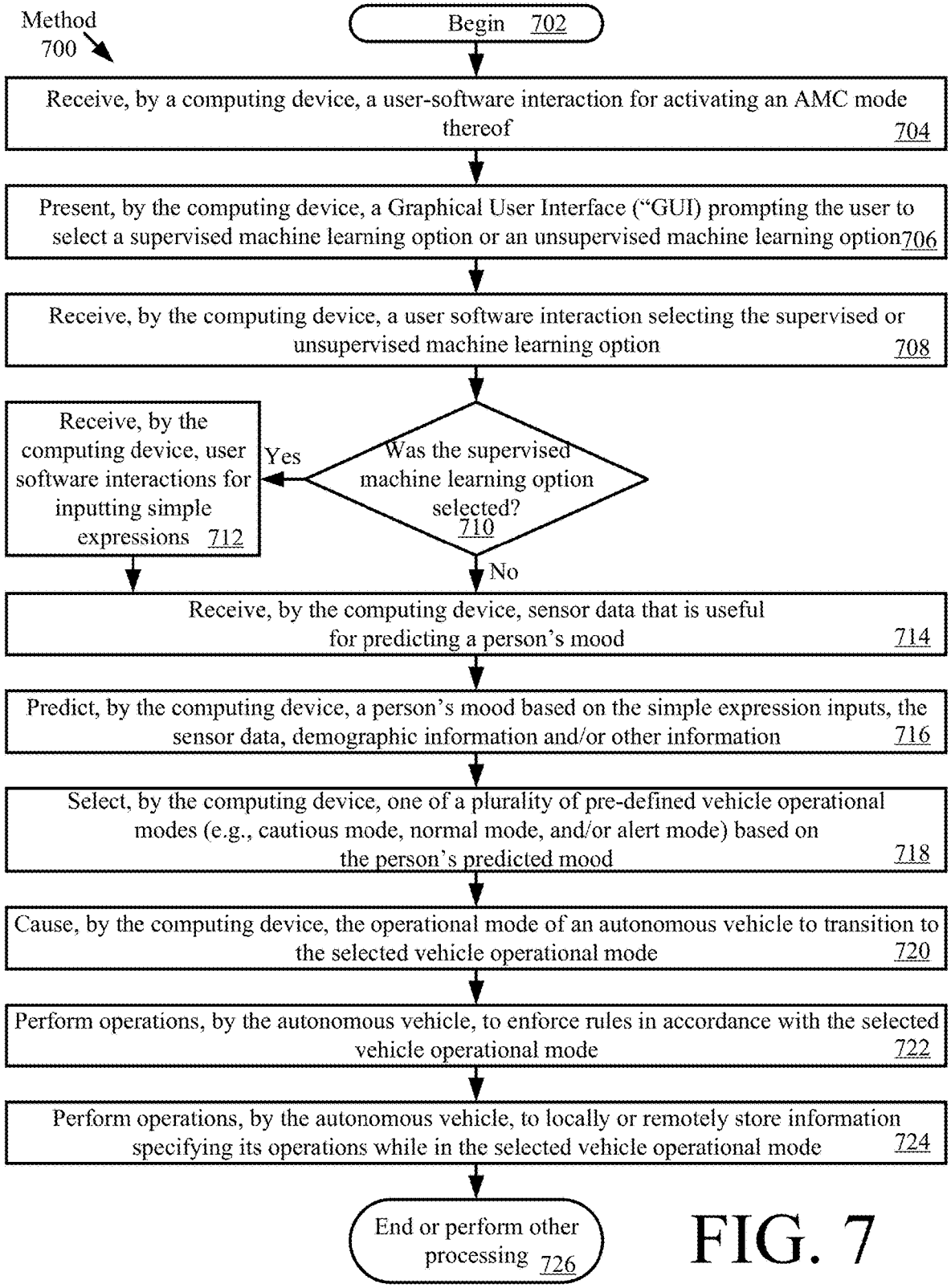
FIG. 7 is a flow diagram of an illustrative method for controlling operations of a vehicle based on a predicted mood of at least one person.

Referring now to FIG. 7, there is provided a flow diagram of an illustrative method 700 for controlling operations of a vehicle (e.g., vehicle 102 of FIG. 1 and/or 200 of FIG. 2) based on a predicted mood of at least one person (e.g., person 114 of FIG. 1). Method 700 comprises a plurality of operations 702-726. The present solution is not limited to the order of the operations 702-726 shown in FIG. 7. Some or all of the operations of 702-726 can be performed in the same or different order than that shown in FIG. 7. Also, one or more of the operations 702-726 can be eliminated from method 700 in accordance with a given application.

As shown in FIG. 7, method 700 begins with 702 and continues with 704 where a computing device (e.g., computing device 106 of FIG. 1, 220 of FIG. 2 and/or 400 of FIG. 4) receives a user-software interaction for activating an AMC mode thereof. The user software interaction can include, but is not limited to, the selection of an item from a drop down menu or the depression of a virtual button presented on a display (e.g., display 454 of FIG. 4) of the computing device.

Once the AMC mode is activated, the computing device presents a Graphical User Interface ("GUI") in 706 prompting a user to select a supervised machine learning option or an unsupervised machine learning option. In 708, the computing device receives a user software interaction selecting the supervised or unsupervised machine learning option, or any other methods. The user software interaction can include, but is not limited to, the selection of an item from a drop down menu or the depression of a virtual button presented on a display (e.g., display 454 of FIG. 4) of the computing device. If the unsupervised machine learning option was selected [710:NO], then 714 is performed. 714 will be discussed below.

If the supervised machine learning option was selected [710:YES], then 712 is performed where the computing device receives user software interactions for inputting simple expressions about how the person feels in addition to the sensory information that it receives in subsequent 714. The user software interaction can include, but is not limited to, the selection of an item from a drop down menu or the depression of a virtual button presented on a display (e.g., display 454 of FIG. 4) of the computing device. Subsequently, method 700 continues with 714.

In 714, the computing device receives sensor data. This sensor data is used in 716 to predict a person's mood or emotion in addition to or as an alternative to the simple expression inputs, demographic information and/or other information (e.g., social media information and/or sensor data indicating the person's activities in relation to vehicle operations). One of a plurality of pre-defined vehicle operational modes is selected in 718 based on the person's predicted mood. The pre-defined vehicle operational modes include, but are not limited to, a normal operational mode, a cautious operational mode, and an alert operational mode. In the normal operational mode, the autonomous vehicle will operate in accordance with its default settings. In the cautious and alert operational mode, the autonomous vehicle will operate in accordance with one or more non-default settings (e.g., for speed, braking, steering, path of travel, etc.). In response to this selection, the autonomous vehicle is caused to transition operational modes to the selected mode, as shown by 720. In effect, the autonomous vehicle performs operations in 722 to enforce the rules in accordance with the selected vehicle operational mode. Information specifying the autonomous vehicles operations while in the selected vehicle operational mode is stored locally or remotely in 724. Subsequently, method 400 ends or other processing is performed (e.g., return to 714 or receive a user software interaction for exiting AMC mode).

Figure 8:
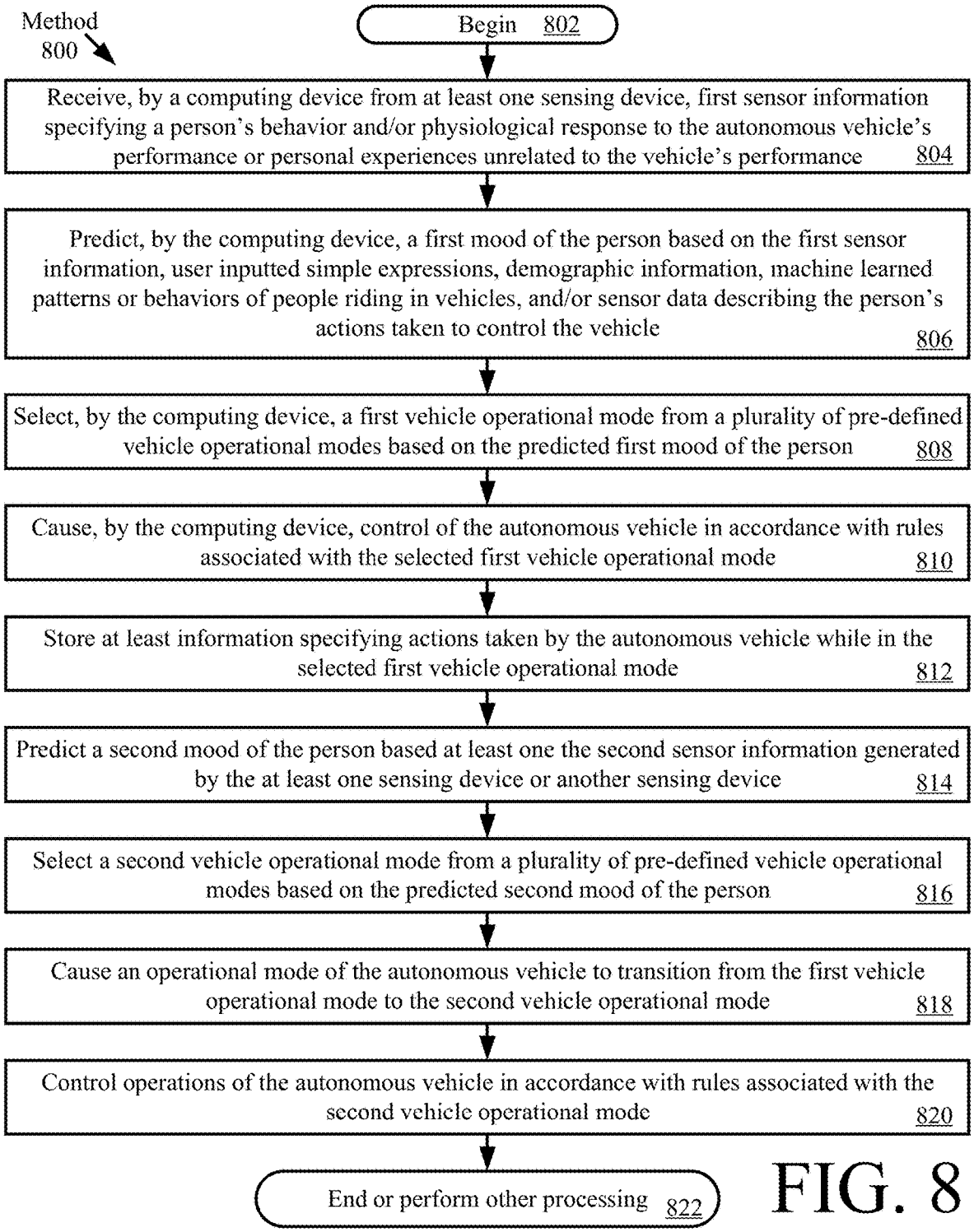
FIG. 8 is a flow diagram of an illustrative method for controlling an autonomous vehicle.

Referring now to FIG. 8, there is provided a flow diagram of an illustrative method 800 for operating a vehicle. Method 800 begins with 802 and continues with 804 where a computing device (e.g., computing device 106 of FIG. 1, 220 of FIG. 2, and/or 400 of FIG. 4) receives first sensor information (e.g., sensor information 314 of FIG. 3) from at least one sensing device (e.g., sensing device 116 of FIG. 1, 236 of FIG. 2, and/or 300 of FIG. 3). The first sensor information specifies a person's behavior and physiological response to the autonomous vehicle's operation and/or personal experience(s) unrelated to the vehicle's operation. The sensing device includes, but is not limited to, a heart rate sensor, a skin perspiration sensor, a facial temperature sensor, a gesture detection sensor, a blinking rate detection sensor, a camera, and/or a microphone. The sensing device is coupled to the person or disposed in the autonomous vehicle so as to be located adjacent to the person while riding in the autonomous vehicle.

Next in 806, the computing device predicts a first mood of the person based on the first sensor information, user inputted simple expressions, demographic information, machine-learned patterns or behaviors of people riding in vehicles, and/or sensor data describing the person's actions taken to control the vehicle. Notably, natural language processing technology can be used to interpret at least one of recorded human speech and simple expression inputs. The demographic information includes, but is not limited to, information indicating a level of distrust, fear, anxiety and/or stress of autonomous vehicles by people having at least one characteristic in common (e.g., age, gender, race, etc.) For example, the demographic information includes information indicating a level of distrust, fear, anxiety and/or stress of autonomous vehicles by people having an age falling within a same pre-defined range within which the person's age exists. The present solution is not limited to the particulars of this example.

In 808, the predicted first mood is used by the computing device to select a first vehicle operational mode from a plurality of pre-defined vehicle operational modes based on the predicted first mood of the person. The operational mode of the autonomous vehicle is transitioned to the selected first vehicle operational mode. In effect, the autonomous vehicle is then controlled in accordance with rules associated with the selected first vehicle operational modes, as shown by 810. At least information specifying actions taken by the autonomous vehicle while in the selected first vehicle operational mode is stored in 812.

Upon completing 812, method 800 continues with 814-820. 814-820 involve: predicting a second mood of the person based at least one the second sensor information generated by the at least one sensing device or another sensing device; selecting a second vehicle operational mode from a plurality of pre-defined vehicle operational modes based on the predicted second mood of the person; causing an operational mode of the autonomous vehicle to transition from the first vehicle operational mode to the second vehicle operational mode; and controlling operations of the autonomous vehicle in accordance with rules associated with the second vehicle operational mode and not with the rules associated with the first vehicle operation mode during a given period of time. Subsequently, 822 is performed where method 800 ends or other processing is performed (e.g., return to 802).

Figure 9:
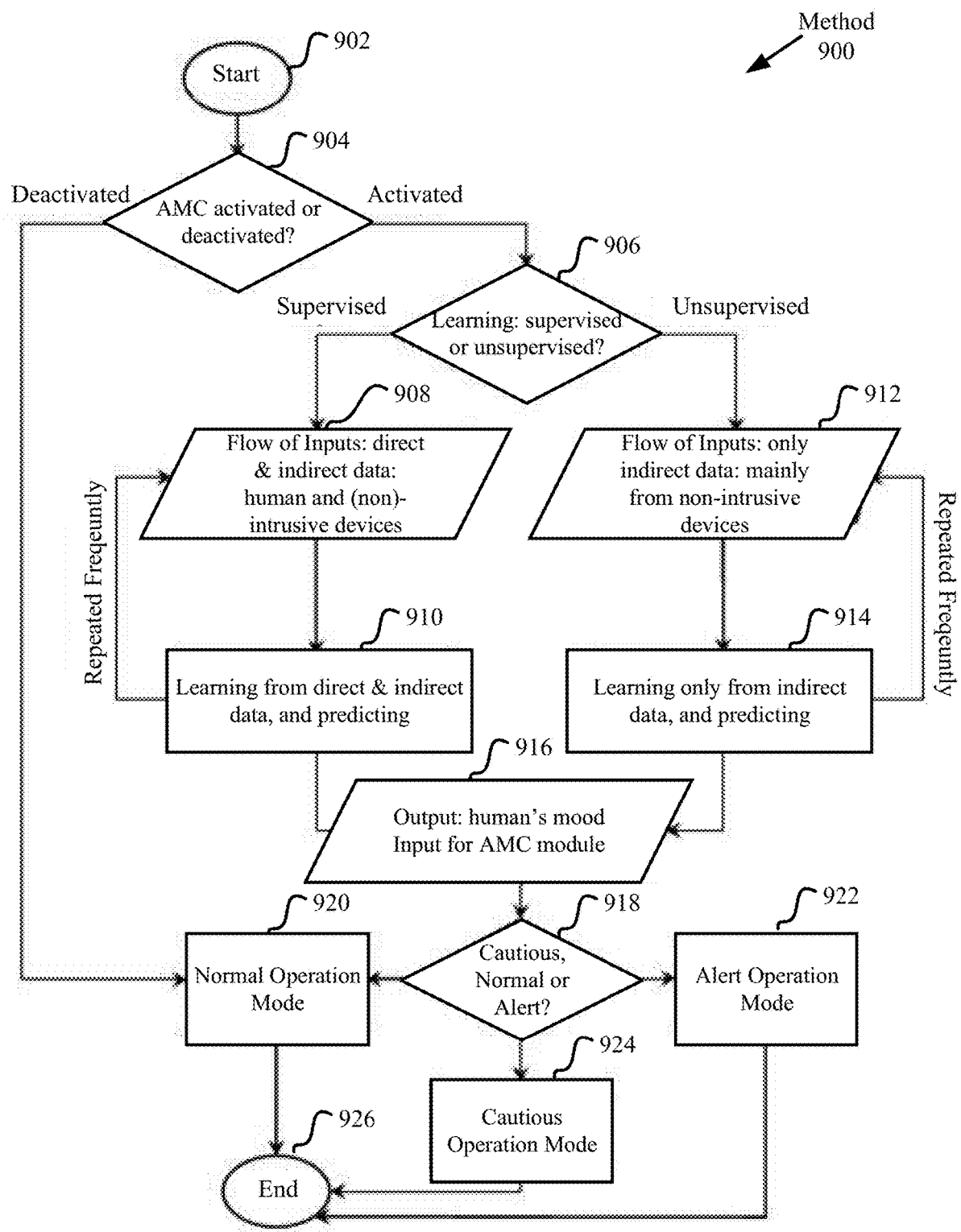
FIG. 9 is a flow diagram of an illustrative method for controlling an autonomous vehicle.

Referring now to FIG. 9, there is provided a flow diagram of an illustrative method 900 for controlling an autonomous vehicle. Method 900 begins with 902 and continues with 904 where a determination is made as to whether AMC is activated or deactivated. If AMC is deactivated, then method 900 continues with 920 where the autonomous vehicle is placed in a normal operation mode. Subsequently, 926 is performed where method 900 ends.

If AMC is activated, then method 900 continues with 906 where a determination is made as to whether the machine learning should be supervised or unsupervised. This determination can be made based on user inputs. If the machine learning is to be supervised, then 908-910 are performed. 908-910 involve: receiving direct or indirect data input from a human and (non)-intrusive devices; learning from the direct data inputs and indirect data inputs; and predicting a human's mood based on the direct and indirect data inputs. Next in 916, the human's mood is output and provided as an input to an AMC module. Upon completing 916, method 900 continues with 918 which will be discussed below.

If the machine learning is to be unsupervised, then 912-914 are performed. 912-914 involve: receiving indirect data inputs (mainly from non-intrusive devices); learning from the indirect data inputs; and predicting a human's mood based on the indirect data input. Next in 916, the human's mood is output and provided as an input to an AMC module. Upon completing 916, method 900 continues with 918.

In 918, a determination is made as to whether the autonomous vehicle should operation in a caution mode, a normal mode, or an alert mode. If it is decided that the autonomous vehicle should operate in the normal mode, then 920 is performed where the autonomous vehicle is placed in the normal mode. If it is decided that the autonomous vehicle should operate in the alert mode, then 922 is performed where the autonomous vehicle is placed in the alert mode. If it is decided that the autonomous vehicle should operate in the cautious mode, then 924 is performed where the autonomous vehicle is placed in the cautious mode. Subsequently, 926 is performed where method 900 ends.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for controlling a fully- or semi-autonomous vehicle, comprising:
receiving, by a computing device from at least one sensing device, first information specifying at least one of (A) a person's emotion and physiological response to the fully- or semi-autonomous vehicle's operation, (B) the person's general feeling in that moment, (C) a detection of unusual activity by the person, and (D) a detection of unusual activity by the fully- or semi-autonomous vehicle;

predicting, by the computing device, a first mood of the person based on at least one of the first information and second information indicating a level of distrust, fear, anxiety or stress relating to autonomous vehicle operation by people having at least one characteristic in common with the person;

selecting, by the computing device, a first vehicle operational mode from a plurality of pre-defined vehicle operational modes when:

(i) the predicted first mood indicates that the person does not currently have fear, anxiety, stress or distrust, and the first information indicates no unusual activity by the fully- or semi-autonomous vehicle and the person has been detected;

(ii) the predicted first mood indicates that the person does currently have fear, anxiety, stress or distrust, and the first information indicates that no unusual activity by the fully- or semi-autonomous vehicle and the person has been detected; or (iii) the predicted first mood indicates that the person does currently have fear, anxiety, stress or distrust, and the first information indicates that unusual activity by the fully- or semi-autonomous vehicle and the person has been detected; and causing, by the computing device, control of the fully- or semi-autonomous vehicle in accordance with rules associated with the selected first vehicle operational mode;

wherein operational modes and parameter values are exchanged with adjacent vehicles for achieving objectives of an Adaptive Mood Control ("AMC") module of the computing device and objectives of the fully- or semi-autonomous vehicle.

2. The method according to claim 1, further comprising receiving user software interactions for inputting simple expressions describing how the person is feeling about the fully- or semi-autonomous vehicle's operation, or how the person is feeling in general in that moment.

3. The method according to claim 2, wherein the first mood is predicted further based on at least one of the simple expressions.

4. The method according to claim 1, wherein the first mood is predicted further based on machine-learned patterns or received data regarding emotion of people riding in vehicles.

5. The method according to claim 1, wherein the first mood is predicted further based on natural language processing technology to interpret at least one of recorded human speech and simple expression inputs.

6. The method according to claim 1, further comprising storing information specifying actions taken by the fully- or semi-autonomous vehicle while in the selected first vehicle operational mode.

7. The method according to claim 1, further comprising an emergency-awareness feature that reports at least one of medically-abnormal states or life-threatening states to emergency units.

8. The method according to claim 1, wherein the at least one sensing device comprises at least one of a heart rate sensor, a skin perspiration sensor, a facial temperature sensor, a gesture detection sensor, a blinking rate detection sensor, a camera, and a microphone.

9. The method according to claim 1, wherein the at least one sensing device is coupled to the person or disposed in the fully- or semi-autonomous vehicle so as to be located adjacent to the person while riding in the fully- or semi-autonomous vehicle.

10. The method according to claim 1, further comprising:
predicting a second mood of the person based on third information generated by the at least one sensing device or another sensing device;
selecting a second vehicle operational mode from a plurality of pre-defined vehicle operational modes based on the predicted second mood of the person; and
causing an operational mode of the fully- or semi-autonomous vehicle to transition from the first vehicle operational mode to the second vehicle operational mode.

11. The method according to claim 1, wherein operations of the fully- or semi-autonomous vehicle are controlled in accordance with rules associated with the second vehicle operational mode and not with the rules associated with the first vehicle operation mode during a given period of time.

12. The method according to claim 1, wherein an operation mode of the fully- or semi-autonomous vehicle is changed based on social media information.

13. The method according to claim 1, wherein the plurality of pre-defined vehicle operational modes comprise a first pre-defined vehicle operational mode in which the fully- or semi-autonomous vehicle performs autonomous driving operations in accordance with only default settings, and a second pre-defined vehicle operational mode in which the fully- or semi-autonomous vehicle performs autonomous driving operations in accordance with at least one non-default setting.

14. The method according to claim 13, wherein the first vehicle operational mode comprises the first pre-defined vehicle operational mode when the predicted first mood indicates that the person does not currently have fear, anxiety, stress or distrust, and the first information indicates no unusual activity by the fully- or semi-autonomous vehicle and the person has been detected.

15. The method according to claim 13, wherein the first vehicle operational mode comprises the second pre-defined vehicle operational mode when:
the predicted first mood indicates that the person does currently have fear, anxiety, stress or distrust, and the first information indicates that no unusual activity by the fully- or semi-autonomous vehicle and the person has been detected; or
the predicted first mood indicates that the person does currently have fear, anxiety, stress or distrust, and the first information indicates that unusual activity by the fully- or semi-autonomous vehicle and the person has been detected.

16. A system, comprising:
a processor;
a non-transitory computer-readable storage medium comprising programming instructions that are configured to cause the processor to implement a method for controlling a fully- or semi-autonomous vehicle, wherein the programming instructions comprise instructions to:
receive from at least one sensing device, first information specifying at least one of (A) a person's emotion and physiological response to the fully- or semi-autonomous vehicle's operation, or (B) the person's general feeling in that moment, (C) a detection of unusual activity by the person, and (D) a detection of unusual activity by the fully- or semi-autonomous vehicle;
predict a first mood of the person based at least one the first information and second information indicating a level of distrust, fear, anxiety or stress relating to autonomous vehicle operation by people having at least one characteristic in common with the person;

select a first vehicle operational mode from a plurality of pre-defined vehicle operational modes based on the predicted first mood of the person when:
  (i) the predicted first mood indicates that the person does not currently have fear, anxiety, stress or distrust, and the first information indicates no unusual activity by the fully- or semi-autonomous vehicle and the person has been detected;
  (ii) the predicted first mood indicates that the person does currently have fear, anxiety, stress or distrust, and the first information indicates that no unusual activity by the fully- or semi-autonomous vehicle and the person has been detected; or
  (iii) the predicted first mood indicates that the person does currently have fear, anxiety, stress or distrust, and the first information indicates that unusual activity by the fully- or semi-autonomous vehicle and the person has been detected; and
cause a control of the fully- or semi-autonomous vehicle in accordance with rules associated with the selected first vehicle operational mode;
wherein operational modes and parameter values are exchanged with adjacent vehicles for achieving objectives of an Adaptive Mood Control ("AMC") module of the computing device and objectives of the fully- or semi-autonomous vehicle.

17. The system according to claim 16, wherein the programming instructions further comprise instructions to receive user software interactions for inputting simple expressions describing how the person is feeling about the fully- or semi-autonomous vehicle's operation, or how the person is feeling in general in that moment.

18. The system according to claim 17, wherein the first mood is predicted further based on at least one of the simple expressions.

19. The system according to claim 16, wherein the first mood is predicted further based on machine-learned patterns or received data regarding emotion of people riding in vehicles.

20. The system according to claim 16, wherein the first mood is predicted further based on natural language processing technology to interpret at least one of recorded human speech and simple expression inputs.

21. The system according to claim 16, wherein the programming instructions further comprise instructions to store information specifying actions taken by the fully- or semi-autonomous vehicle while in the selected first vehicle operational mode.

22. The system according to claim 16, further comprising an emergency-awareness feature that reports at least one of medically-abnormal states and life-threatening states to emergency units.

23. The system according to claim 16, wherein the at least one sensing device comprises at least one of a heart rate sensor, a skin perspiration sensor, a facial temperature sensor, a gesture detection sensor, a blinking rate detection sensor, a camera, and a microphone.

24. The system according to claim 16, wherein the at least one sensing device is coupled to the person or disposed in the fully- or semi-autonomous vehicle so as to be located adjacent to the person while riding in the fully- or semi-autonomous vehicle.

25. The system according to claim 16, wherein the programming instructions further comprise instructions to:
  predict a second mood of the person based on third information generated by the at least one sensing device or another sensing device; and
  select a second vehicle operational mode from a plurality of pre-defined vehicle operational modes based on the predicted second mood of the person; and
  cause an operational mode of the fully- or semi-autonomous vehicle to transition from the first vehicle operational mode to the second vehicle operational mode.

26. The system according to claim 16, wherein operations of the fully- or semi-autonomous vehicle are controlled in accordance with rules associated with the second vehicle operational mode and not with the rules associated with the first vehicle operation mode during a given period of time.

* * * * *